US012768644B2

(12) United States Patent
Placht et al.

(10) Patent No.: US 12,768,644 B2
(45) Date of Patent: Oct. 20, 2026

(54) ARRANGEMENT AND METHOD FOR INCREASING THE MEASUREMENT ACCURACY IN THE THREE-DIMENSIONAL MEASUREMENT OF OBJECTS

(71) Applicant: Metrilus GmbH, Uttenreuth (DE)

(72) Inventors: Simon Placht, Baiersdorf (DE); Christian Schaller, Erlangen (DE); Michael Balda, Baiersdorf (DE); Bjoern Kayser, Berlin (DE)

(73) Assignee: Metrilus GmbH, Uttenreuth (DE)

( * ) Notice: Subject to any disclaimer, the term of this patent is extended or adjusted under 35 U.S.C. 154(b) by 1032 days.

(21) Appl. No.: 17/971,767

(22) Filed: Oct. 24, 2022

(65) Prior Publication Data

US 2023/0129186 A1 Apr. 27, 2023

(30) Foreign Application Priority Data

Oct. 25, 2021 (EP) .................................... 21204533

(51) Int. Cl.

| | |
|---|---|
| ***G01B 11/24*** | (2006.01) |
| ***H04N 23/53*** | (2023.01) |
| ***H04N 23/56*** | (2023.01) |

(52) U.S. Cl.

CPC ............. *G01B 11/24* (2013.01); *H04N 23/53* (2023.01); *H04N 23/56* (2023.01)

(58) Field of Classification Search

CPC ..... G01S 7/48–51; G01B 11/00; G01B 11/24; G01B 11/22; G01B 11/14; G01B 11/0608; G01B 11/06; G01B 11/02; G01B 11/026

See application file for complete search history.

(56) References Cited

U.S. PATENT DOCUMENTS

2006/0112023 A1 5/2006 Horhann et al.
2012/0043015 A1* 2/2012 Feller ...................... B29C 63/02 156/247

(Continued)

FOREIGN PATENT DOCUMENTS

CN 110580732 A 12/2019
CN 111273439 A 6/2020

(Continued)

OTHER PUBLICATIONS

Cha SW, Cho SH, Sohn JS, Ryu Y, Ahn J. Reflectance According to Cell Size, Foaming Ratio and Refractive Index of Microcellular Foamed Amorphous Polymer. Int J Mol Sci. Dec. 2, 2019;20(23):6068. (Year: 2019).*

(Continued)

*Primary Examiner* — Yuqing Xiao
(74) *Attorney, Agent, or Firm* — Christopher A. Rothe; CM Law

(57) ABSTRACT

An arrangement for increasing measurement accuracy in three-dimensional measurement of objects, and a method for three-dimensional measurement of objects. The arrangement has a base for placing thereon an object to be measured, a device for emitting light beams toward the object, a device for detecting light beams reflected by the object and the substrate, and a device for determining 3D data based on travel time measurements and/or triangulation of the emitted light beams and reflected light beams, and for determining dimensions of the outer shell of the object. A measurement inaccuracy range affected by interferences and forming on the substrate is bridged and spaced from the actual measurement position by a transparent plate with a predetermined thickness arranged between the at least one object and the substrate, so that the determination of dimensions of the (Continued)

outer shell of the object is only partially possible and becomes more precise.

16 Claims, 6 Drawing Sheets

(56) References Cited

U.S. PATENT DOCUMENTS

| | | | | |
|---|---|---|---|---|
| 2018/0347962 | A1 | 12/2018 | Zhao et al. | |
| 2022/0018965 | A1 * | 1/2022 | Lobnik | G01S 7/497 |

FOREIGN PATENT DOCUMENTS

| | | | | |
|---|---|---|---|---|
| CN | 211121547 | U | 7/2020 | |
| JP | 3230773 | U | 2/2021 | |
| WO | WO-2022149315 | A1 * | 7/2022 | G06T 7/60 |

OTHER PUBLICATIONS

Polarization (Waves). Wikipedia. Retrieved from the internet: <https://en.wikipedia.org/wiki/Polarization_(waves)#Polarized_sunglasses> (Year: 2020).*

Search Report received in European Application No. 21204533.0-1010, dated Mar. 30, 2022, with translation, 15 pages.

* cited by examiner

ARRANGEMENT AND METHOD FOR INCREASING THE MEASUREMENT ACCURACY IN THE THREE-DIMENSIONAL MEASUREMENT OF OBJECTS

This application claims priority under 35 U.S.C. § 119 to European Application No. 21 204 533.0, filed Oct. 25, 2021, the content of which is incorporated by reference herein in its entirety.

FIELD

The present disclosure relates to an arrangement for three-dimensional measurement of objects and to a corresponding method.

BACKGROUND

In the transportation and logistics industry, volume and weight data of goods form the basis for calculating transportation and storage costs and are also limiting factors in warehousing as well as in the use of freight space. Due to the constantly growing global transport volume and increasingly complex supply chains, there is a high demand for data acquisition processes that enable automated, fast and cost-effective determination of volume and weight data in order to be able to determine the packaging of goods, transport utilization, warehousing and cost calculation as efficiently as possible.

Especially for the determination of volume data, light-based measuring units such as time-of-flight (TOF) cameras, light detection and ranging (LIDAR) cameras, but also structured light (SL) cameras and stereo (S) cameras are often used and combined with a weighing device. Light-based measurement units offer the advantage of being much faster and more precise than manual measurement procedures. An arrangement with a depth camera and a weighing device for determining and transmitting volume or weight data is known, for example, from JP 3 230°773 U and CN 2 11 121 547 U.

The prior art known from JP 3 230°773 U and CN 2 11 121 547 U has the disadvantage that measuring units which work according to the measuring principle of the time-of-flight method, such as depth cameras or TOF cameras, show inaccuracies in measuring results of relatively low objects which have an object height of less than or equal to 50 mm in relation to a supporting surface or a substrate, due to interference effects. In particular, very small or very flat objects with an object height less than or equal to 10 mm in relation to the substrate are sometimes not measurable or are recorded with strong measurement inaccuracies.

The reason for the inaccuracies in the time-of-flight measurements are interference effects such as temporal noise, multiple reflections and, especially with TOF cameras, additional stray light.

Noise in general refers to the deterioration of a digital or electronically recorded image due to disturbances that have no relation to the actual image content, the image signal. Temporal noise includes all noise sources that influence the temporal progression of a pixel value from image acquisition to image acquisition, and comprises photon noise, dark current, readout noise and quantization noise.

Multiple reflections occur because light emitted from a TOF or LIDAR camera can take additional indirect paths in addition to the direct path from the camera to the object and back again, for example, from the camera to a person standing close to the target and then from that person to the object and back to the camera. As a result, data of the indirect light paths/multiple reflections are mixed with the data of the actual useful light, which represents the direct light path, and thus result in inaccuracies in the 3D data.

Stray light is caused by unwanted reflections within or behind the lens of a TOF camera. Also, bright surfaces that are very close to the light source quickly scatter too much light into the lens. Stray light thus leads to a low-contrast intensity image from TOF cameras, which is why highly reflective surfaces in the space immediately in front of the camera should be avoided in particular.

Due to the aforementioned interference effects, a range that can be virtually perceived by the measuring unit forms on a background on which an object to be measured is located. Depending on the interference effects of the respective measuring unit, this range extends several millimeters in the height direction from the background and in which 3D data of the object to be measured are measured incorrectly or cannot be captured. In particular, smaller objects that have a height of less than 10 mm in relation to the background can partially sink completely into the inaccuracy range or be surrounded by it almost over their entire height extension, so that their measurement is strongly falsified or impossible.

The aforementioned inaccuracy range also occurs in other light-based measurement units such as SL cameras and stereo cameras, but is partially caused by other interference effects.

Similar to TOF or LIDAR cameras, the accuracy range for SL and stereo cameras is affected by temporal noise. In addition, errors in the localization of projected pattern areas also occur with SL and stereo cameras, because in order to calculate accurate depth data, the projected pattern areas must be localized extremely accurately, to within a fraction of a pixel. In this case, small mislocalizations are hardly avoidable, leading to inaccuracies in the 3D data.

Furthermore, changes in the stereo base can occur in the SL and stereo cameras, which are caused by temperature expansion or mechanical torsion and as a result the geometric constellation of light pattern projector and camera can change slightly within the measuring unit and consequently lead to falsified images during triangulation. Again, inaccuracies in the depth data are the result and affect the accuracy range at the subsurface.

The aforementioned state of the art of light-based measuring units such as TOF, LIDAR, S, SL cameras thus has the disadvantage that on the subsurface on which the object to be measured is located, there is an area that can be perceived by the camera measuring units, which can lead to erroneous 3D data and thus to erroneous volume measurements, especially for objects to be measured with a low object height in relation to the subsurface.

SUMMARY

Based on the state of the art described above and its disadvantages, the invention is based on the task of providing a measuring arrangement and a method that enable precise 3D measurement data to be acquired from the object to be measured and that allow the dimensions of the object to be measured to be determined accurately.

According to a first aspect of the invention, the arrangement for three-dimensional measurement of objects comprises a planar substrate for placing thereon at least one object to be measured, an emitting device for emitting light beams in the direction of the at least one object, a receiving device for detecting the light beams reflected by the at least one object and the background, and a determining device for determining 3D data on the basis of light travel time measurements and/or triangulation of the emitted and reflected light beams and for determining the dimensions of the outer shell of the at least one object from the determined 3D data.

Further, the arrangement for measuring objects comprises a transparent plate having a predetermined thickness D for placement between the at least one object and the substrate, wherein the thickness D is higher than the interfering measurement inaccuracy range forming on the substrate, and wherein the determining device corrects the determined 3D data or the determined dimensions of the outer shell of the at least one object by the thickness D of the transparent plate.

The transparent plate may be a transparent plastic or glass plate. The thickness D of the plate is preferably in a range between 1 and 50 millimeters, particularly preferably in a range between 1 and 8 millimeters.

The transparent plate, which is not perceptible to the determining device, makes it possible, on the one hand, for the emitted light rays to continue to pass through to the background almost undisturbed and to be reflected, so that the measurement inaccuracy range, which is virtually perceptible to the camera, continues to be formed above the background, but, on the other hand, the object to be measured is lifted out of the measurement inaccuracy range, so to speak, and is spaced from the background. By lifting the object to be measured out of the measurement inaccuracy range, it becomes possible to acquire error-free 3D data from the outer contours of the object to be measured outside the measurement inaccuracy range, whereby the artificially increased object height caused by the interposed transparent plate is corrected by a fixed amount corresponding to the height or thickness of the transparent plate.

More precisely, the height of the interposed transparent plate is subtracted from the erroneous or manipulated measurement height of the object. By deliberately choosing the height or thickness of the transparent plate to be larger than the expected measurement inaccuracy range or measurement noise rug above the background and subsequently subtracting this again from the measurement result, the measurement inaccuracies due to the interference effect have no influence on the final (corrected) measurement result.

Further, according to a second aspect of the invention, the determining device may first determine 3D data of the object to be at least one, including the transparent sheet and the substrate serving as the reference surface, and determine a virtual planar separation plane parallel to the reference surface and spaced apart therefrom by at least the thickness D. Furthermore, the determining device can separate and eliminate the determined 3D data between the separation plane and the reference surface from the remaining determined 3D data and determine the dimensions of the outer shell of the object to be at least one based on the remaining 3D data.

By determining the virtual separation plane, it is possible to precisely and in a defined manner separate the 3D data with high measurement accuracy above the measurement inaccuracy range from the erroneous or 3D measurement data with lower measurement accuracy within the measurement inaccuracy range, and to eliminate the acquired 3D measurement data with errors below the separation plane. By eliminating the 3D data of the measurement accuracy range that is unnecessary for the outer dimensions of the object to be measured, the computational effort and the error-proneness for calculating the outer dimensions of the object to be measured are significantly reduced at the same time.

In another preferred aspect of the invention, the arrangement for three-dimensional measurement of objects may comprise at least one adjustment mimic, such as an adjustable lifting column, for spacing the transparent plate in the height direction by a distance A in a range of 0.1-20 millimeters from the substrate and parallel thereto.

The additional distance A between the transparent plate and the substrate offers the advantage that even in the case where the measurement inaccuracy range, which can vary variably due to external influences, extends from the substrate in the height direction over the thickness D of the transparent plate and thus surrounds sections of the object to be measured and falsifies its recorded 3D data, the transparent plate can be raised by a distance A so that at least the upper side of the transparent plate facing the object to be measured is completely outside the measurement inaccuracy range. The (preliminary) measurement result is corrected accordingly by the sum of the thickness D of the transparent plate and the distance A.

In other words, the height adjustment of the transparent plate enabled by the at least one lifting column allows a flexible adaptation of the measurement position to different extents of the measurement inaccuracy range, so that the measurement object can always be positioned outside the measurement inaccuracy range and thus a precise 3D data acquisition of the object to be measured is enabled, free from disturbing influences of the measurement inaccuracy range. Preferably, the lifting column may be driven by a servo motor.

According to a further aspect, the arrangement for three-dimensional measurement of objects may comprise an input device for manual or automated input of the thickness D of the transparent plate and/or the distance A between transparent plate and/or an input interface for receiving the thickness D of the transparent plate and/or the distance A between transparent plate and substrate measured by a measuring device.

The manual input offers the advantage that the thickness D of the transparent plate interposed between the object and the substrate, which is known to the user, can be entered precisely for the determining device without errors occurring in this case in the determination of the thickness D of the transparent plate by the determining device. The input device can be designed as a PC. A data carrier on which a configuration file with corresponding dimensions of the transparent plate is stored can also serve as the input device.

The variable-adjustable distance A between the transparent plate and the substrate, which is set by a lifting column with preferably a servomotor, can be precisely detected by a measuring device in the servomotor, for example a resolver, incremental encoder or absolute encoder, and transmitted to the determining device via a data or input interface.

According to another aspect of the arrangement for three-dimensional measurement of objects, the emitting device, the receiving device and the determining device for the time-of-flight measurement of the emitted and reflected light beams may be implemented as a TOF camera and/or as a LIDAR camera, or the emitting device, the receiving device and the determining device for the triangulation of the emitted and reflected light beams may be implemented as an SL camera and/or as a stereo camera.

Preferably, the substrate of the arrangement for the three-dimensional measurement of objects can have an opaque surface and/or the transparent plate can have, on the side facing the substrate, an opaque, light diffuse-reflecting functional layer, in particular a plastic hard foam layer, which diffuse-reflects light falling through the transparent plate.

The opaque surface or opaque functional layer offers the advantage that the light is diffusely reflected and thus defined degrees of reflection can be made possible, so that a uniform light distribution can be determined for the determining device in all areas in which the emitted light strikes the opaque surface. This avoids mirror effects that can lead to overexposure or can reflect the emitted light past the receiver unit, thereby providing no data.

According to a further aspect, the transparent plate may comprise at least one layer of electrochromic glass, preferably with adjustable transmittance.

This has the advantage that the transmittance of the transparent plate can be adjusted to different application conditions, such as changing ambient light conditions, and thereby influence the intensity of the reflected light.

Another advantage of the electrochromic glass is that it can be switched completely opaque, thus the light emitted by the emitting device can no longer pass through the plate, which was previously transparent, and is reflected directly at the top of the now opaque plate. By making the top surface of the now intransparent plate opaque, the top surface of the plate becomes detectable by the determining device and the distance to the top surface of the plate can be measured.

Based on the measured distance values of the determining device with a transparent plate, in which the emitted light rays are reflected at the substrate, and in conjunction with the measured distance values with the opaque-switched plate, in which the emitted light rays are reflected at the top side of the plate, the determining device can determine the thickness D of the transparent plate from the difference of the two distance measurements.

Furthermore, the transparent plate can have at least one replaceable, transparent layer, preferably protective film, made of plastic, which protects the transparent plate from surface damage, in particular scratches, so that the optical properties of the transparent plate remain unchanged.

The replaceable, transparent protective film makes it possible to effectively protect the transparent plate from surface damage such as scratches that can occur when placing the object to be measured. At the same time, worn transparent protective films can be easily replaced, allowing for easy maintenance of the support surface of the transparent plate.

In another aspect, the transparent plate may have polarizing properties.

The polarizing properties of the transparent plate can reduce distracting reflections that lead to measurement inaccuracies.

Furthermore, the base for placing the object to be measured can be formed by a supporting surface of a balance.

This offers the advantage that volume and weight measurement of the object can be carried out simultaneously. Furthermore, a scale that is coupled to the arrangement for the three-dimensional measurement of objects does not have to be converted first and is thus already coordinated with the rest of the measurement arrangement.

In other words, the substrate with the transparent plate attached to it can provide a standardized attachment for balances or act as a weighing pan. The specific properties of the substrate and its optionally opaque surface, as well as the properties of the transparent plate, may be stored in a configuration file and transferred to the determining device via an input device.

In a further aspect, the transparent panel may be implemented as part of an electrically driven display, in particular an LCD or OLED display.

In addition to the transparent plate, the display may be used in a supportive manner to separate the object from the background. This separation is performed according to the following principle:

In addition to the determining device for the acquisition of 3D data, the system can also be equipped with one or more color cameras. Each color camera is calibrated to the determining device, i.e. both a projective image of the color camera and a rigid body transformation between the 3D determining device and color camera are determined.

The rigid body transformation is used here to describe the position and orientation of the 3D data set acquired by the determining device, i.e. its coordinate system, with respect to a reference coordinate system, namely that of the color camera.

With the help of the rigid body transformation, the outer shell of the captured object can be transformed to the image plane of each color camera.

In the case that the outer shell transformed to the image plane of the color camera still contains image areas that protrude beyond the object when matched to the object on the display, the transformed outer shell is further refined or adjusted using matching, i.e. the corresponding protruding areas are removed from the outer shell.

The identification of display areas in the color image is done by a temporal analysis of each individual pixel, e.g. by playing a fast black and white sequence on the display. In areas of the transformed outer shell protruding to the display, these color changes will be clearly visible, whereas in areas belonging to the object, no color changes will be visible due to the obscuring of the display.

In other words, by playing the fast black-and-white sequence on the display, it thus becomes possible to match the 3D data acquired by the determining device, which have been transformed into a virtual projection of the outer shell into the color image of the color camera, with the real object to be measured on the display with high precision, to correct it, and thus to further increase the measurement accuracy. This is because the black and white color changes around the object being measured on the display, which are perceptible to the color camera, create a high contrast, so to speak, which is perceptible over time, between overlapping areas of the projection of the outer shell of the color camera and the color-changing display background. The high contrast enables precise separation of overlapping regions of the target and the projection of the outer shell, on the one hand, and regions of the projection of the outer shell that protrude above the target and overlap with the color-changing display, on the other hand.

In accordance with another aspect of the invention, there is provided a method of measuring objects in three dimensions, comprising the steps of: Placing at least one object to be measured on a planar substrate, emitting light beams in the direction of the at least one object and detecting the light beams reflected from the at least one object and the substrate, determining 3D data based on time-of-flight measurements and/or triangulation of the emitted and reflected light beams, and determining the dimensions of the outer shell of the at least one object from the determined 3D data, arranging a transparent plate with a predetermined thickness D between the at least one object and the substrate, the thickness D being greater than a measurement inaccuracy range forming on the substrate, and correcting the determined 3D data or the determined dimensions of the outer shell of the at least one object by the thickness D of the transparent plate.

The method for three-dimensional measurement of objects makes it possible to determine 3D data of the object to be measured that are not influenced or distorted by the measurement inaccuracy range forming on the substrate, and automatically corrects the determined 3D data or determined dimensions of the outer shell of the at least one object by the thickness D of the transparent plate.

According to a further aspect, the method for three-dimensional measurement of objects may comprise determining 3D data of the at least one object together with the transparent plate and the substrate serving as reference surface, determining a virtual, planar separation plane extending parallel to the reference surface and spaced therefrom by the thickness D, separating and eliminating the determined 3D data between the separation plane and the reference surface from the remaining determined 3D data, and determining the dimensions of the outer shell of the at least one object based on the remaining 3D data.

By the determination step of the virtual separation plane, it is possible to separate the 3D data with high measurement accuracy above the measurement inaccuracy range from the erroneous or 3D measurement data with lower measurement accuracy within the measurement inaccuracy range in a precise and defined manner and to eliminate the 3D measurement data from the measurement inaccuracy range. By eliminating the 3D data of the measurement inaccuracy range that is unnecessary for the outer dimensions of the object to be measured, the computational effort and the error-proneness for the calculation of the outer dimensions of the object to be measured are reduced at the same time.

BRIEF DESCRIPTION OF THE DRAWINGS

The invention is explained in more detail below with reference to preferred embodiments with the aid of drawings.

DETAILED DESCRIPTION

Examples of embodiments of the present disclosure are described below on the basis of the accompanying figures. The same elements are indicated by the same reference signs. Features of the individual embodiments may be interchanged with each other.

Figure 1:
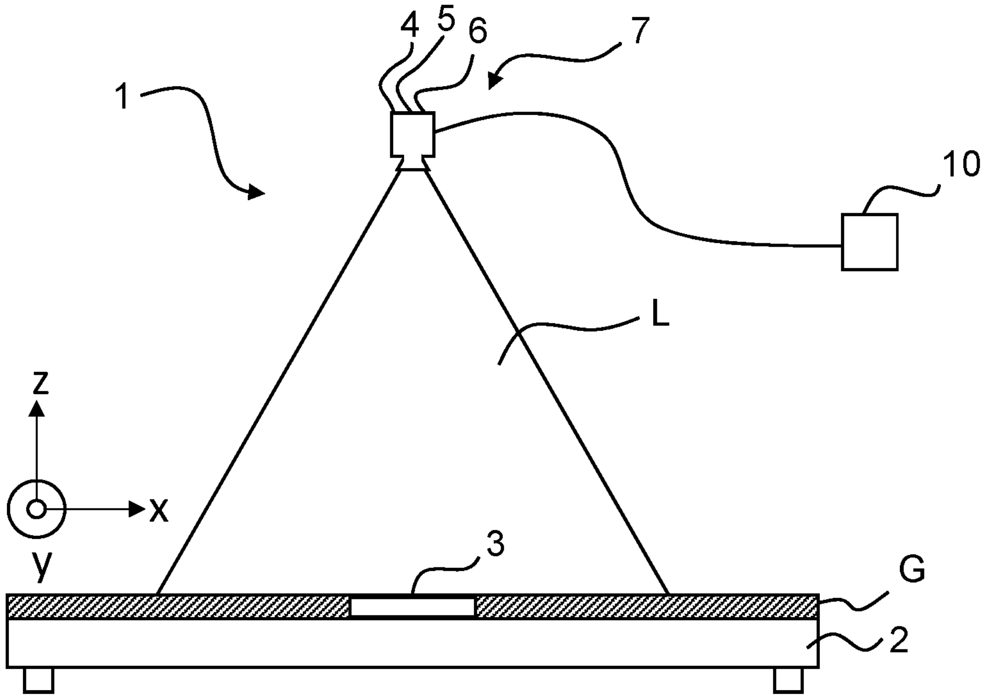
Fig. 1 Prior Art
FIG. 1 is a representation of an arrangement for three-dimensional measurement of objects according to the prior art.

FIG. 1 shows an arrangement 1 for three-dimensional measurement of objects with a planar substrate 2 on which there is an object 3 to be measured which is less than or equal to 10 mm in height. Located centrally above the object 3 to be measured is a emitting device 4 for emitting light beams L in the direction of the at least one object 3, a receiving device 5 for detecting the light beams reflected by the object 3 and the substrate 2, and a determining device 6 for determining 3D data on the basis of time-of-flight measurements and/or triangulation of the transmitted light beams L and reflected light beams and for determining the dimension of the outer shell of the object 3 from the determined 3D data. The emitting device 4, the receiving device 5 and the determining device 6 are usually all part of a measuring unit 7, specifically for example a TOF, LIDAR, SL or stereo camera 7.

As can be seen from FIG. 1, a measurement inaccuracy range G, which can be perceived virtually by the determining device 6 of the measurement unit 7, is formed on the surface of the ground 2. Depending on certain interference effects and depending on the measurement unit 7 (TOF, LIDAR, SL or stereo camera) used, this measurement inaccuracy range extends several millimeters in the height direction from the ground and in which 3D data of the object 3 to be measured are measured falsely or cannot be detected if the object 3 is located completely or almost completely within the measurement inaccuracy range G. The measurement inaccuracy range G is formed by the measurement unit 7 and the determining device 6.

The measurement inaccuracy range G is caused by different interference effects and varies depending on the measuring unit 7 used. In the case of measuring units 7 that use TOF or LIDAR cameras for the measurement process, the interference effects include, for example, temporal noise and multiple reflections. In the case of TOF cameras, there is also stray light.

In the case of measuring units 7 that use SL or stereo cameras, the interference effects that occur are, for example, temporal noise, errors in the localization of projected pattern areas, and changes in the stereo base.

As can be seen from FIG. 1, the object 3 is located entirely within the measurement inaccuracy range G due to its low height in the z-direction, which makes it impossible or only possible to a limited extent for the measurement unit 7 to precisely determine the distance to the top edge of the object 3 and to acquire accurate 3D data.

Figure 2:
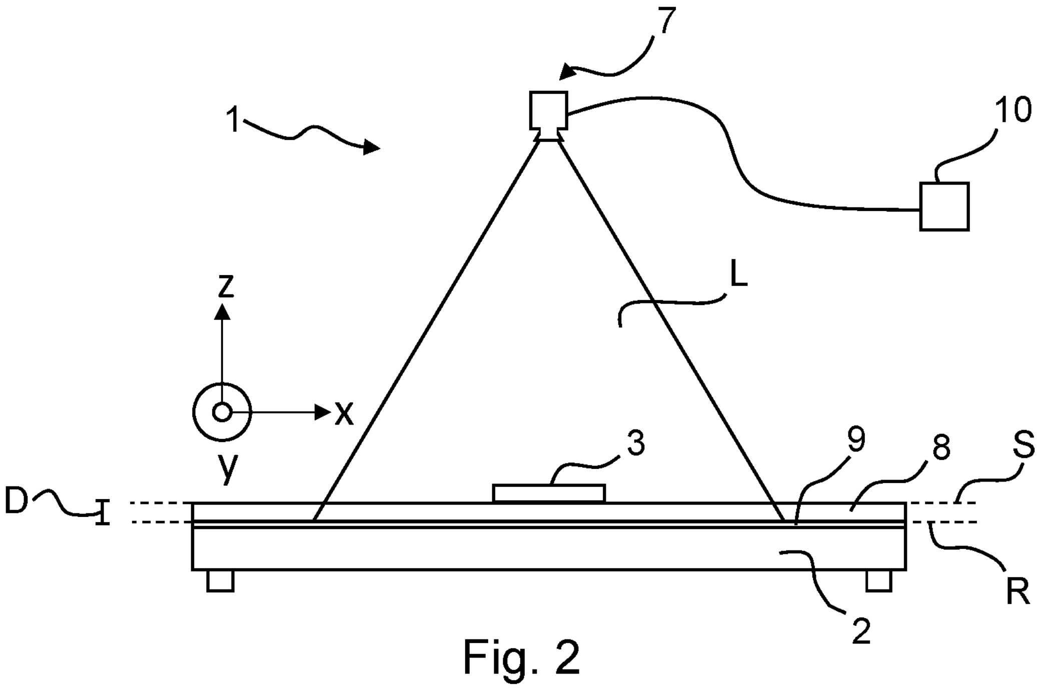
FIG. 2 is a representation of an arrangement for three-dimensional measurement of objects according to a first embodiment of the invention.

In order to circumvent the measurement inaccuracy range G and enable precise measurements of the object 3, as shown in FIG. 2, according to a first embodiment of the invention, a transparent plate 8 with thickness D is placed between the object 3 and the substrate 2. The thickness of the transparent plate may range between 1-50 mm. In addition, an opaque functional layer 9, which is preferably a plastic hard foam layer and diffuse-reflects, is also arranged between the substrate 2 and the transparent plate 8, so that a uniform light distribution can be determined for the determining device 6 in all areas in which the emitted light L hits on the opaque surface.

Through the transparent plate 8, which is not perceptible to the determining device 6, the emitted light rays L continue to pass through almost undisturbed as far as the substrate 2 or the opaque functional layer 9 and are then reflected, so that the measurement inaccuracy range G, which is virtually perceptible to the measuring unit 7, continues to be formed on the substrate 2 or on the opaque functional layer 2, but on the other hand the object 3 to be measured is, as it were, highlighted from the measurement inaccuracy range G and is spaced apart from the substrate 2.

In other words, the measurement inaccuracy range G is formed within the transparent plate 8, which is not perceptible to the measuring unit 7, while the object 3 to be measured rests on the transparent plate 8 and is thus spaced from the measurement inaccuracy range G.

During the three-dimensional measurement of the object 3, the determining device 6 first determines 3D data of the object 3 together with the measurement inaccuracy range G and the functional layer 9, which serves as the reference surface R. At the same time, the determining device 6 also determines a virtual, planar separation plane S that runs parallel to the reference surface and is spaced apart from it by at least the thickness D. Subsequently, the determining device 6 separates the determined 3D data between separation plane S and reference surface R from the remaining determined 3D data and eliminates the 3D data from the intermediate area of the reference surface R and the separation plane S. Thereupon, the determining device 6 precisely determines the dimensions of the outer shell of the 3D object based on the remaining 3D data.

Here, the thickness D of the transparent plate 8 can be precisely input via an input device 10. The input device 10 can be designed as a PC. A data carrier on which a configuration file with corresponding dimensions of the transparent plate 8 is stored can also serve as input device 10.

The thickness D of the plate 8 is selected here in coordination with the measurement inaccuracy range G, which varies depending on the environmental conditions and the measuring unit 7 used. In principle, the thickness D of the plate 8 is selected so that it is at least a factor of 1.2 higher than the inaccuracy range G occurring with known environmental parameters, in order to space the object 3 to be measured completely outside the measurement inaccuracy range G even in the event of unforeseen fluctuations in the inaccuracy range G, in which the latter is higher than planned.

Figure 3:
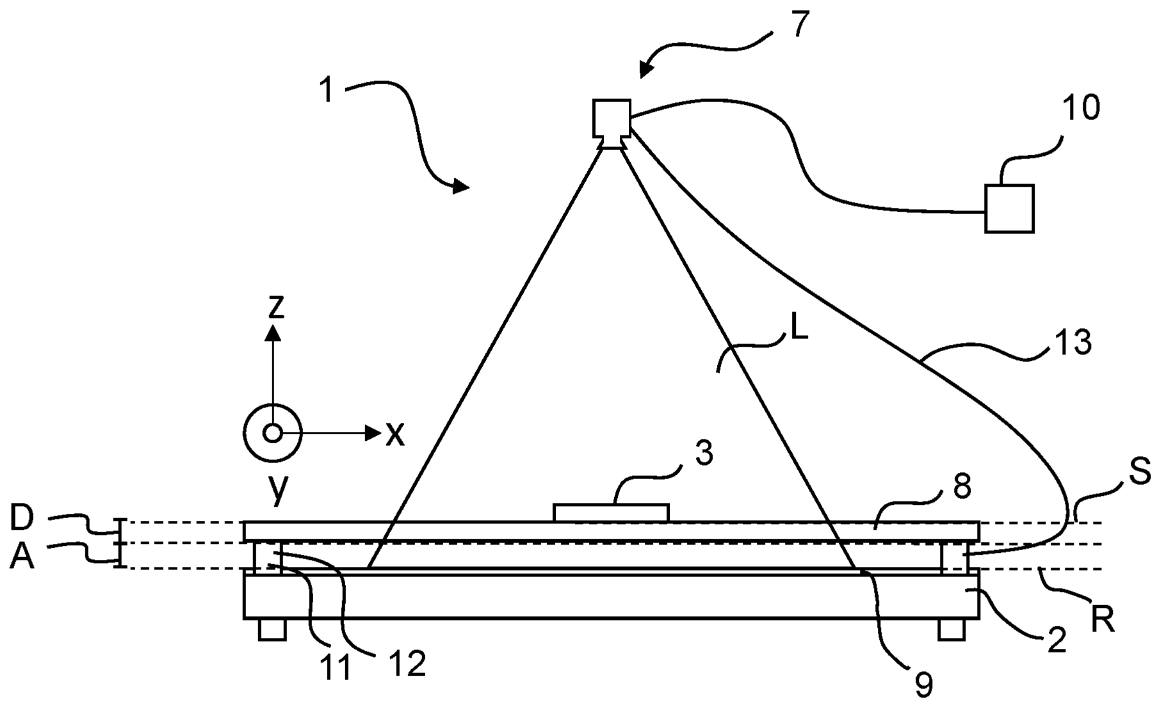
FIG. 3 is a representation of an arrangement for three-dimensional measurement of objects according to a second embodiment of the invention.

FIG. 3 shows an arrangement 1 for three-dimensional measurement of objects 3 according to a second embodiment according to the invention. In contrast to the first embodiment, the second embodiment additionally has lifting columns 11 by means of which the transparent plate 8 can be moved relative to and perpendicular to the substrate 2. The lifting columns 11 are provided in particular for the case where the measurement inaccuracy range G extends in the z-direction beyond the transparent plate and surrounds the object 3. In this case, the object 3 can be spaced further in the z-direction by the variable distance A, which is between 0.1 and 20 mm, from the substrate 2 and the functional layer 9 by the lifting columns 11, so that the object 3 lies outside the measurement inaccuracy range G.

The lifting columns 11 can be driven in this case, for example, by a servomotor which has a measuring device 12 for recording the travel distance, for example a resolver, incremental encoder or absolute encoder. The travel distance, which corresponds to the distance A, is passed on to the measuring unit 7 via an input interface 13.

The dimensions of the object to be measured are here calculated to the volume, where the variable x stands for the length, the variable y for the width and the variable z for the measured height H, minus the plate thickness D and the distance A traversed by the lifting column 11, of the object to be measured.

In other words, note that the height H measured by the measuring device must be corrected with the thickness D of the transparent plate 8 and the distance A adjustable by the lifting columns. Accordingly, the volume calculation formula for the determining device 6 or measuring device 7 of the present invention is:

$$V=(x)(y)(z)=(x)(y)(H-(D+A)).$$

Figure 4:
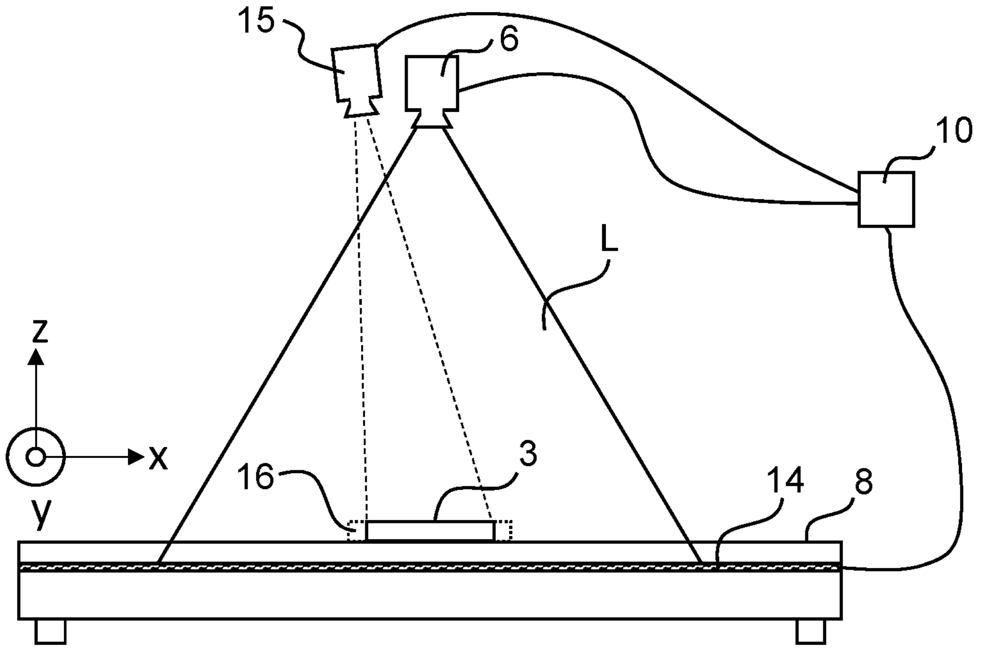
FIG. 4 is a representation of an arrangement for three-dimensional measurement of objects according to a third embodiment of the invention.

FIG. 4 shows an arrangement 1 for three-dimensional measurement of objects 3 according to a third embodiment according to the invention. In the third embodiment, the transparent plate 8 is designed as part of an electrical display 14. Here, the display supports the separation of the object 3 and the substrate 2 or the display 14 covering the substrate 2.

In addition to the determining device 6 for acquiring 3D data, the arrangement 1 also has a color camera 15. The color camera 15 is thereby calibrated to the determining device 6, i.e. both a projective image of the color camera 15 and a rigid body transformation between the 3D determining device 6 and color camera 15 are determined.

The rigid body transformation is used here to describe the position and orientation of the 3D data set acquired by the determining device 6, i.e. its coordinate system, with respect to a reference coordinate system, namely that of the color camera 15.

With the aid of the rigid body transformation, the outer shell 16 of the recorded object 3 can be transformed to the image plane of the color camera 15.

Figure 5:
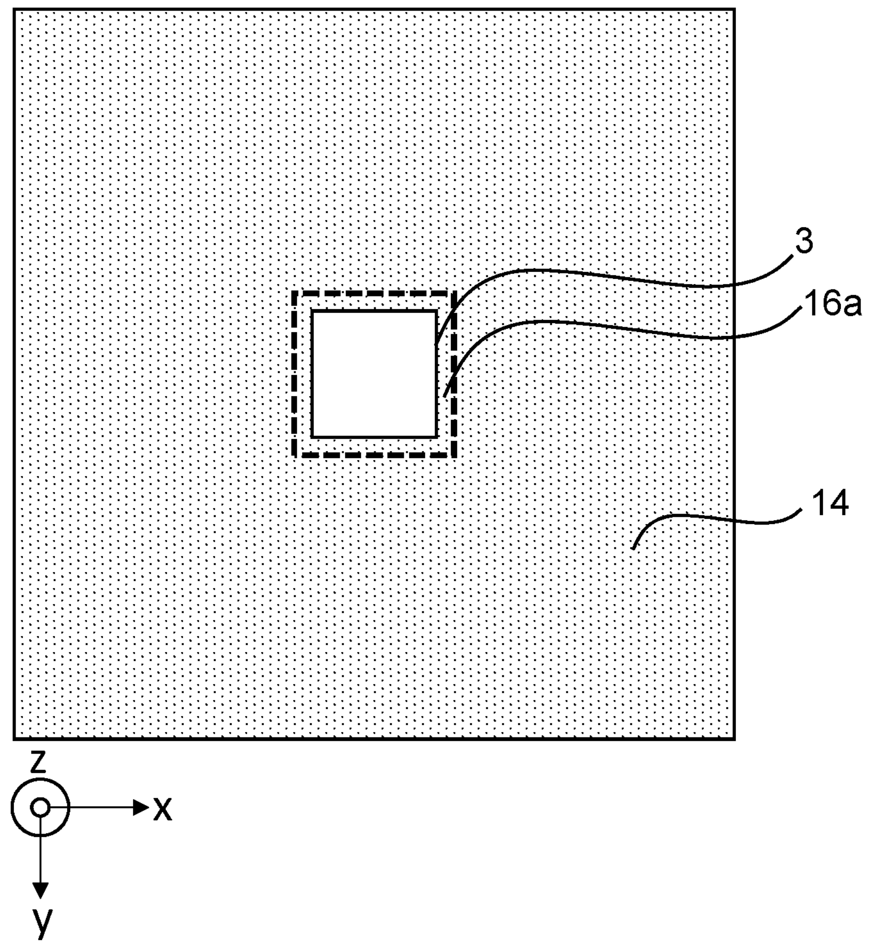
FIG. 5 is a top view of the display shown in FIG. 4, as well as the object to be measured and a protruding portion of a transformed outer shell.

FIG. 4 and FIG. 5 show how the outer shell 16 transformed to the image plane of the color camera 15 still contains image areas that protrude above the object 3 when aligned with the object 3 located on the display 15. By matching the transformed outer shell 16 in the captured color image of object 3 and display 14, the three-dimensional measurement can be further refined or adjusted by removing the corresponding areas 16*a*, shown in FIG. 5, of the transformed outer shell 16 that protrude above the object 3.

In this case, the identification of display areas in the color image is done by a temporal analysis of each individual pixel, e.g. by playing a fast black and white sequence on the display 14. In areas 16*a* of the transformed outer shell 16 protruding to the display 14, these color changes will be clearly visible, whereas in areas belonging to the object 3, no color changes will be visible due to the obscuring of the display 14.

Both the electric display 14 and the additional color camera 15 are controlled and configured by the input device 10.

Figure 6:
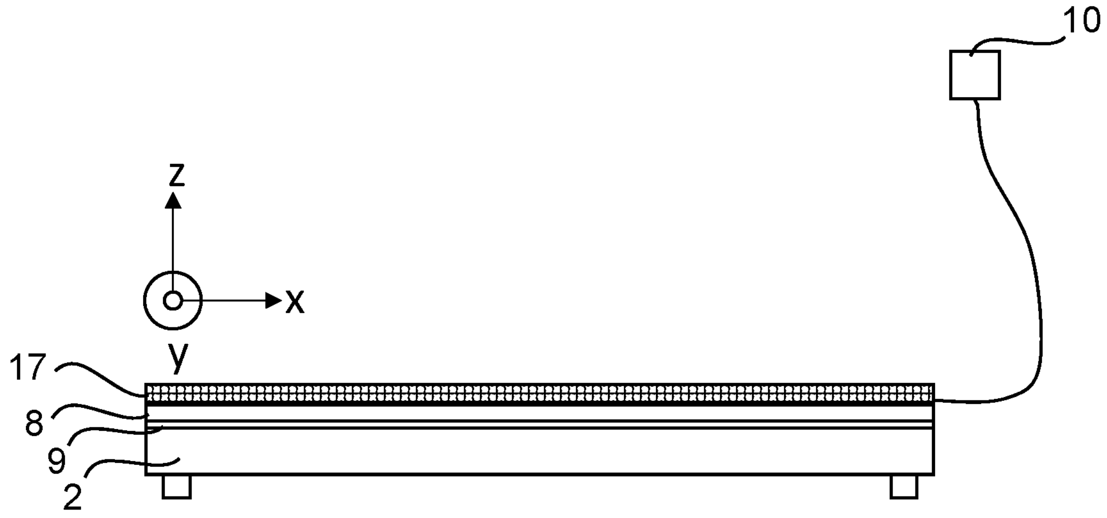
FIG. 6 is a representation of an arrangement for three-dimensional measurement of objects according to a fourth embodiment of the invention without a measuring device.

In FIG. 6, a fourth embodiment of the background 2 is shown. The substrate 2 has an opaque functional layer 9 and a transparent plate 8 with a layer of electrochromic glass 17. The transmittance of the electrochromic glass 17 is adjustable and can be switched completely opaque, so that the light L emitted by the emitting device 4 can no longer pass through the previously transparent plate 8 and is reflected directly on the upper surface of the now opaque plate 8. By making the electrochromic glass 17 opaque, the top surface of the plate 8 becomes detectable by the detecting device 6 and the distance to the top surface of the plate 6 can be measured.

With the switchability of the electrochromic glass 17 from a transparent to an opaque state, measured distance values of the determining device 6 in the transparent state of the electrochromic glass 17, in which the emitted light rays L are reflected at the substrate 2, in conjunction with measured distance values of the opaque switched, electrochromic glass 17, in which the emitted light rays L are reflected at the upper side of the electrochromic glass 17, the determining device 6 determines the thickness D of the transparent plate 8 from the difference between the two distance measurements (in the transparent and opaque state). The electrochromic glass 17 is controlled by the input device 10.

Figure 7:
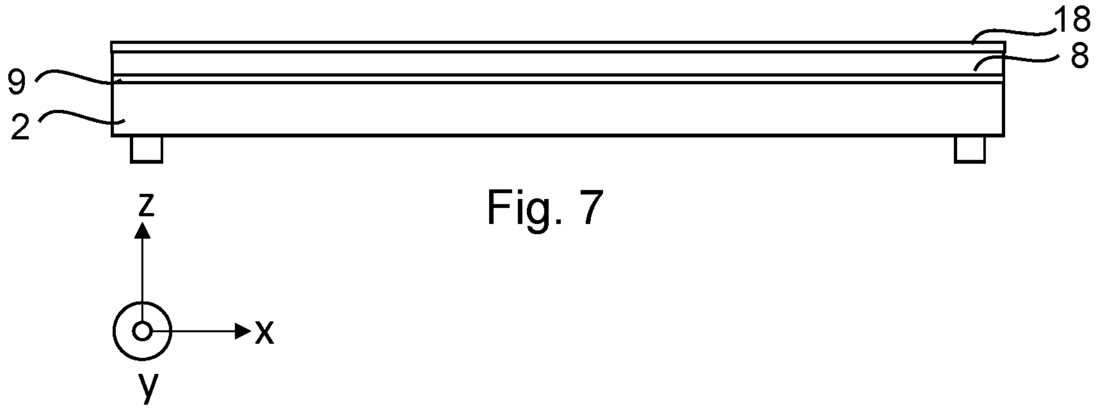
FIG. 7 is a representation of an arrangement for three-dimensional measurement of objects according to a fifth embodiment of the invention without a measuring device.

In FIG. 7, a fifth embodiment of the substrate 2 is shown with opaque functional layer 9, transparent plate 8 and, in addition, another protective film 18 that protects the transparent plate 8 from scratches and other damage to ensure stable transmission properties of the transparent plate 8.

Figure 8:
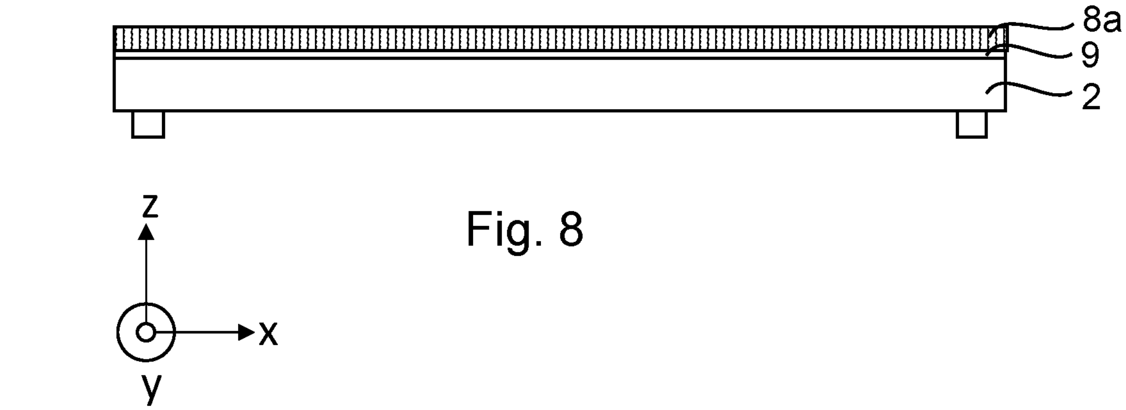
FIG. 8 is a representation of an arrangement for three-dimensional measurement of objects according to a sixth embodiment of the invention without a measuring device.

In FIG. 8, a sixth embodiment of the substrate 2 is shown, wherein the substrate 2 has a transparent plate 8*a* with polarizing properties in addition to the opaque functional layer 9. The polarizing properties of the transparent plate 8*a* serve to reduce reflections and thus increase the measurement accuracy of the arrangement 1.

Figure 9:
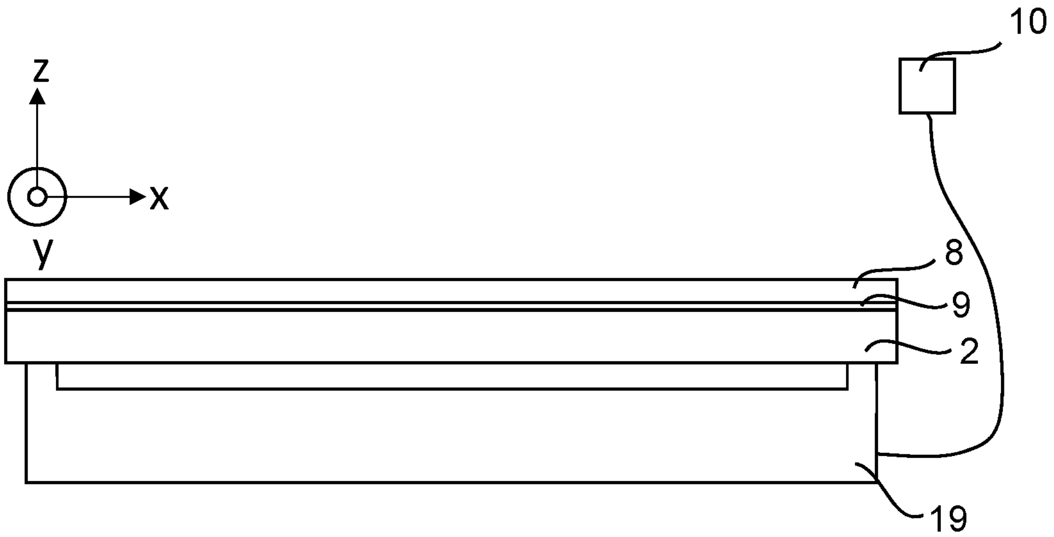
FIG. 9 is an illustration of an arrangement for three-dimensional measurement of objects according to a seventh embodiment of the invention without a measuring device.

FIG. 9 shows a seventh embodiment of the substrate 2 with opaque functional layer 9 and transparent plate 8, wherein the substrate 2 is designed as a supporting surface of a balance 19. The balance 19 is controlled here by the input device 10.

Figure 10:
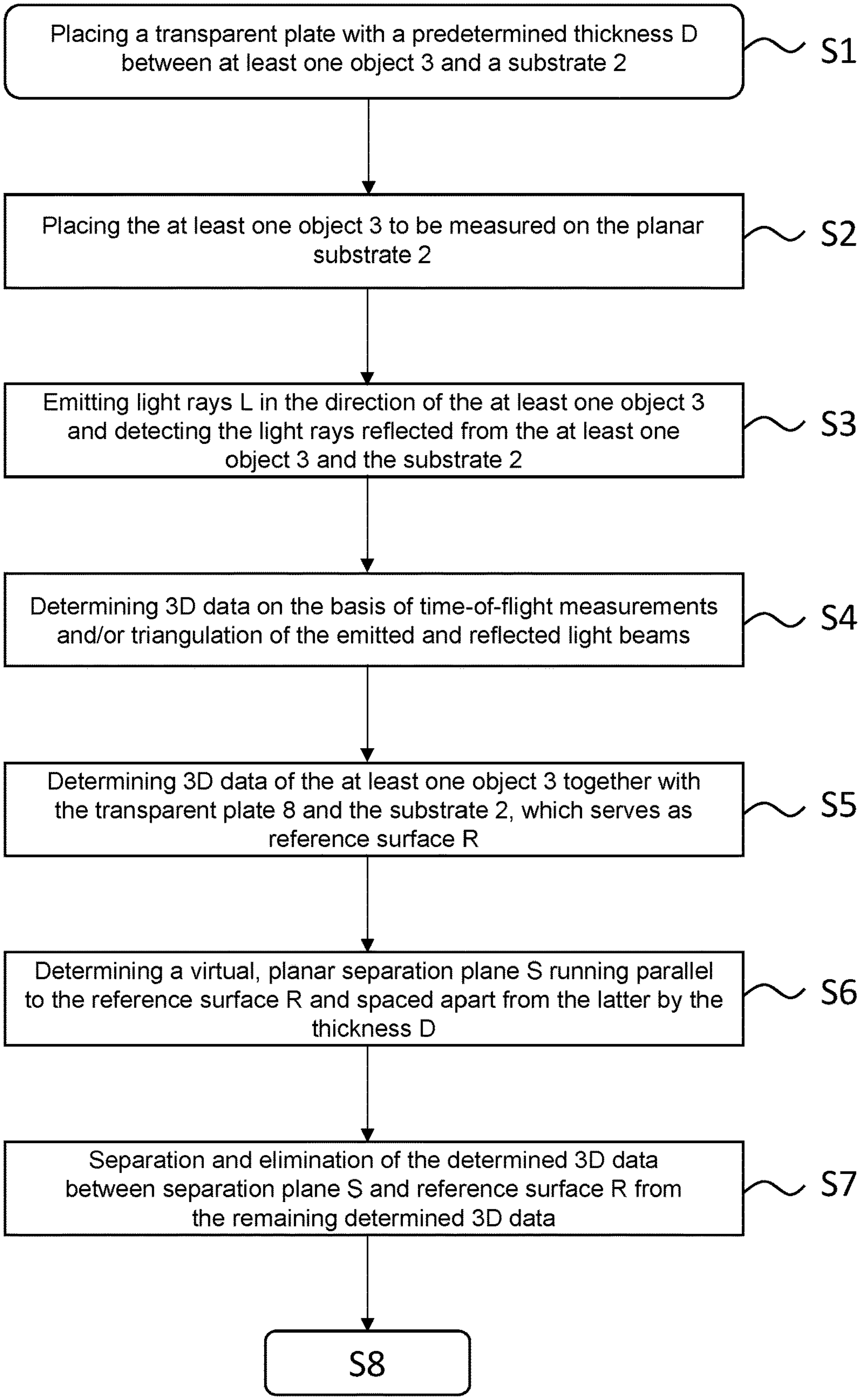
FIG. 10 is a flow chart of a method according to the invention for three-dimensional measurement of objects.
Figure 11:
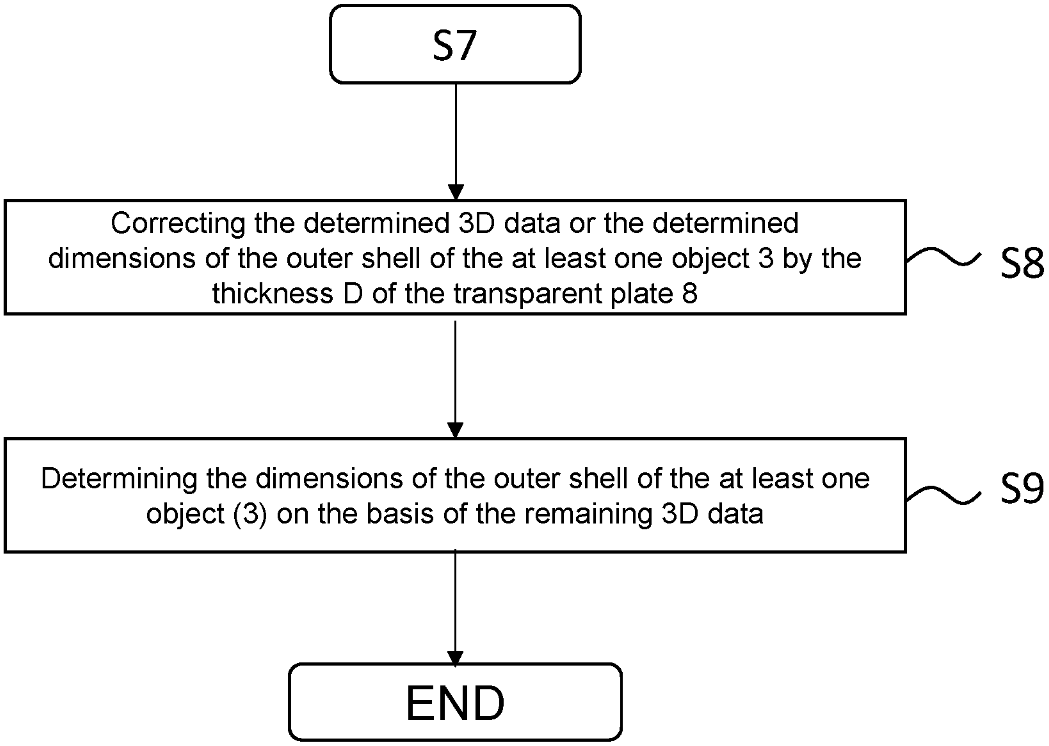
FIG. 11 shows a continuation of the flowchart of the method according to the invention for three-dimensional measuring of objects.

FIG. 10 and FIG. 11 show a flow chart depicting the sum and logical sequence of the process steps of the method according to the invention for the three-dimensional measurement of objects.

First, in step S1, the transparent plate 8 with a predetermined thickness D is placed between at least one object 3 and a substrate 2.

In step S2, the at least one object 3 to be measured is placed on the planar substrate 2.

In step S3, light rays L are detected in the direction of the at least one object 3 and light rays reflected from the at least one object 3 and the subsurface 2.

In step S4, 3D data is obtained based on time-of-flight measurements and/or triangulation of the emitted and reflected light beams.

In step S5, the 3D data of the object 3 to be at least one including the transparent plate 8 and the subsurface 2 serving as the reference surface R are determined.

In step S6, a virtual, planar separation plane S is determined, which runs parallel to the reference surface R and is spaced from it by the thickness D.

In step S7, the determined 3D data between separation plane S and reference surface R are separated from the remaining determined 3D data and eliminated.

In step S8, the determined 3D data or the determined dimensions of the outer shell of the at least one object 3 are corrected by at least the thickness D of the transparent plate 8.

In step S9, the dimensions of the outer shell of the at least one object 3 are determined using the remaining 3D data.

After step S9, the measurement is completed.

The invention claimed is:

1. An arrangement for three-dimensional measurement of objects comprising:

a planar substrate for placing thereon at least one object to be measured;

an emitting device for emitting light beams in the direction of the at least one object;

a receiving device for detecting the light beams reflected from the at least one object and the substrate;

a determining device for determining 3D data on the basis of time-of-flight measurements and/or triangulation of the emitted and reflected light beams and for determining the dimensions of the outer shell of the at least one object from the determined 3D data; and a transparent plate having a thickness for placement between the at least one object and the substrate, the thickness being higher than a measurement inaccuracy range present above the substrate, the thickness being in a range between 1 and 8 millimeters, wherein the determining device corrects the determined 3D data or the determined dimensions of the outer shell of the at least one object by the thickness of the transparent plate, in that the determining device first determines 3D data of the at least one object to be measured together with the transparent plate and the substrate, which serves as reference surface;

wherein the determining device determines a virtual, planar separation plane running parallel to the reference surface and spaced apart from the latter by at least the thickness of the transparent plate;

the determining device separates and eliminates the determined 3D data between the separation plane and the reference surface from the remaining determined 3D data; and the determining device determines the dimensions of the outer shell of the at least one object on the basis of the remaining 3D data.

2. The arrangement for three-dimensional measurement of objects according to claim 1, wherein the transparent plate is a plastic plate.

3. The arrangement for three-dimensional measurement of objects according to claim 1, wherein the arrangement comprises at least one adjustable lifting column for spacing the transparent plate in height direction by a distance in a range of 0.1-20 millimeters from the substrate.

4. The arrangement for three-dimensional measurement of objects according to claim 1, wherein the arrangement comprises an input device for manual or automated input of the thickness of the transparent plate and/or an input interface for receiving the distance between the transparent plate and the substrate measured by a measuring device.

5. The arrangement for three-dimensional measurement of objects according to claim 1, wherein:

the emitting device, the receiving device and the determining device for the time-of-flight measurement of the emitted and reflected light beams are designed as a time-of-flight camera and/or as a LiDAR camera; or the emitting device, the receiving device and the determining device for the triangulation of the emitted and reflected light beams are designed as a structured light camera and/or as a stereo camera.

6. The arrangement for three-dimensional measurement of objects according to claim 1, wherein the substrate has an opaque surface and/or the transparent plate has, on the side facing the substrate, an opaque, light-reflecting layer, which reflects light falling through the transparent plate.

7. The arrangement for three-dimensional measurement of objects according to claim 6, wherein the transparent plate has on the side facing the substrate a diffuse reflecting layer.

8. The arrangement for three-dimensional measurement of objects according to claim 7, wherein the transparent plate has on the side facing the substrate a diffuse reflecting layer which is a plastic hard foam layer.

9. The arrangement for three-dimensional measurement of objects according to claim 1, wherein the transparent plate has at least one layer of electrochromic glass.

10. The arrangement for three-dimensional measurement of objects according to claim 9, wherein the at least one layer of electrochromic glass has an adjustable transmittance.

11. The arrangement for three-dimensional measurement of objects according to claim 1, wherein the transparent plate has at least one replaceable transparent layer, as protective film, made of plastic, which protects the transparent plate from surface damage, like scratches, so that the optical properties of the transparent plate remain unchanged.

12. The arrangement for three-dimensional measurement of objects according to claim 1, wherein the transparent plate has polarizing properties.

13. The arrangement for three-dimensional measurement of objects according to claim 1, wherein the substrate is formed by a supporting surface of a balance.

14. The arrangement for three-dimensional measurement of objects according to claim 1, wherein the transparent plate is designed as part of an electrically controlled display.

15. The arrangement for three-dimensional measurement of objects according to claim 14, wherein the electrically controlled display is a LCD or OLED display.

16. A method for three-dimensional measurement of objects, comprising the steps of:

placing at least one object to be measured on a planar substrate;

emitting light beams in the direction of the at least one object and detecting the light beams reflected by the at least one object and the substrate;

determining 3D data based on time-of-flight measurements and/or triangulation of the emitted and reflected light beams; and determining the dimensions of the outer shell of the at least one object from the determined 3D data, arranging a transparent plate with a predetermined thickness between the at least one object and the substrate, the thickness being greater than a measurement inaccuracy range present above the substrate, the thickness being in a range between 1 and 8 millimeters;

correcting the determined 3D data or the determined dimensions of the outer shell of the at least one object by the thickness of the transparent plate, determining 3D data of the at least one object to be measured together with the transparent plate and the substrate serving as reference surface;

determining a virtual, planar separation plane running parallel to the reference surface and spaced from it by the thickness;

separating and eliminating the determined 3D data between the separation plane and the reference surface from the remaining determined 3D data; and determining the dimensions of the outer shell of the at least one object from the remaining 3D data.

* * * * *